(12) United States Patent
Kato

(10) Patent No.: US 7,773,778 B2
(45) Date of Patent: Aug. 10, 2010

(54) AUTHENTICATION APPARATUS AND AUTHENTICATION METHOD

(75) Inventor: Yumi Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 1069 days.

(21) Appl. No.: 11/456,031

(22) Filed: Jul. 6, 2006

(65) Prior Publication Data
US 2007/0019845 A1    Jan. 25, 2007

(30) Foreign Application Priority Data
Jul. 25, 2005    (JP) ............................... 2005-214852

(51) Int. Cl.
*G06K 9/00*    (2006.01)
(52) U.S. Cl. ........................ 382/115; 382/116; 382/117; 382/118; 382/124; 382/125; 902/3; 902/4; 902/5
(58) Field of Classification Search ................. 382/115, 382/116, 124, 125, 117, 118; 902/3, 4, 5
See application file for complete search history.

(56) References Cited

U.S. PATENT DOCUMENTS

| | | | | |
|---|---|---|---|---|
| 5,473,144 | A * | 12/1995 | Mathurin, Jr. | 235/380 |
| 5,920,640 | A * | 7/1999 | Salatino et al. | 382/124 |
| 6,040,786 | A * | 3/2000 | Fujioka | 340/928 |
| 6,547,130 | B1 * | 4/2003 | Shen | 235/380 |
| 6,877,097 | B2 * | 4/2005 | Hamid et al. | 713/186 |
| 6,970,583 | B2 * | 11/2005 | Black | 382/124 |
| 7,048,183 | B2 * | 5/2006 | Coughlin et al. | 235/382 |
| 7,286,691 | B1 * | 10/2007 | Modl et al. | 382/115 |
| 7,415,138 | B2 * | 8/2008 | Schneider et al. | 382/115 |
| 2002/0138767 | A1 * | 9/2002 | Hamid et al. | 713/202 |
| 2003/0149661 | A1 * | 8/2003 | Mitchell et al. | 705/39 |
| 2004/0071322 | A1 * | 4/2004 | Choshi et al. | 382/115 |
| 2004/0236701 | A1 * | 11/2004 | Beenau et al. | 705/64 |

FOREIGN PATENT DOCUMENTS

| | | |
|---|---|---|
| JP | 2003242492 | 8/2003 |
| WO | WO2004/077346 A1 * | 9/2004 |

* cited by examiner

*Primary Examiner*—Matthew C Bella
*Assistant Examiner*—Michael A Newman
(74) *Attorney, Agent, or Firm*—K&L Gates LLP

(57) ABSTRACT

An authentication apparatus is provided. The authentication apparatus acquires a plurality of pieces of registration authentication information each of which is unique to an authentication target. These pieces of registration authentication information are based on biological information obtained from different and the same kind of parts of a living body of a registered user. The authentication apparatus also acquires biological information from a part of the living body selected by a user, and then generates personal authentication information based on the biological information acquired. The authentication apparatus subsequently arranges a collation order of the plurality of pieces of registration authentication information, and then sequentially collates the plurality of pieces of registration authentication information with the personal authentication information in accordance with the collation serial numbers. After that the authentication apparatus notifies an external section of the authentication target whose registration authentication information corresponds to the personal authentication information as an authentication target successfully authenticated.

6 Claims, 4 Drawing Sheets

AUTHENTICATION APPARATUS AND AUTHENTICATION METHOD

CROSS REFERENCES TO RELATED APPLICATIONS

The present application claims priority to Japanese Patent Application JP2005-214852 filed in the Japanese Patent Office on Jul. 25, 2005, the entire contents of which being incorporated herein by reference.

BACKGROUND

The present application relates to an authentication apparatus and authentication method, and is preferably utilized to perform personal authentication using biological information, for example.

A technology of biometrics authentication has been put to practical use. The technology of biometrics authentication is safer than a technology of general personal authentication that uses passwords, because the technology of biometrics authentication uses personal biological information such as fingerprints and vein patterns as authentication information (see Jpn. Pat. Laid-open Publication No. 2003-242492, for example).

The technology of biometrics authentication previously extracts a feature quantity from user's biological information, and then registers the feature quantity as registration authentication information of the user. When process of personal authentication is performed, a feature quantity of a user who is to be authenticated is extracted from his/her biological information and then personal authentication information is generated. And then the personal authentication information is verified by the registration authentication information. When the personal authentication information corresponds to the registration authentication information, the user is authenticated as a legitimate user.

Since biological information is unique to a human body and unchangeable forever, the technology of biometrics authentication that uses the personal authentication information which is based on the biological information can verify and authenticate an individual without fault. With authentication process for credit cards and cash cards, the above-noted technology of biometrics authentication is utilized.

Noncontact IC cards, which include an antenna inside a card and wirelessly exchange data with a card reader are becoming popular. Compared to a contact-type card such as a magnetic card, the noncontact IC card is easy to use, because a user can use the noncontact IC card just by putting the noncontact IC card on the card reader.

If the above-noted technology of biometrics authentication is applied to the noncontact IC card, an authentication device may collate the registration authentication information which is registered on the noncontact IC card with the personal authentication information which was generated by extracting the feature quantity from the biological information of a user who is to be authenticated.

In this case, if the same piece of registration authentication information has been registered with a plurality of noncontact IC cards and these noncontact IC cards are placed on the card reader at the same time, the authentication device has difficulty in determining which noncontact IC card should be authenticated.

SUMMARY

The present application has been made in view of the above points and is intended to provide an authentication apparatus and authentication method capable of performing an authentication process after adequately selecting an arbitrary authentication target from among a plurality of authentication targets with simple operation.

In an embodiment, an authentication apparatus includes: registration authentication information acquisition means for acquiring a plurality of pieces of registration authentication information each of which is unique to an authentication target, the plurality of pieces of registration authentication information being based on biological information obtained from different and the same kind of parts of a living body of a registered user; personal authentication information generation means for acquiring biological information from a part selected by a user from among the parts of the living body of the user to be authenticated, and then generating personal authentication information based on the biological information acquired; collation means for arranging a collation order of the plurality of pieces of registration authentication information acquired, and then sequentially collating the plurality of pieces of registration authentication information with the personal authentication information in accordance with the collation serial numbers; and notification means for notifying an external section of the authentication target whose the registration authentication information corresponds to the personal authentication information as an authentication target successfully authenticated.

Therefore, what the user to be authenticated has to do is just to perform authentication operation using a part of a living body which corresponds to an arbitrary authentication target. As a result, this authentication target is selected from among a plurality of authentication targets and then is authenticated.

In an embodiment, an authentication apparatus includes: registration authentication information acquisition means for acquiring a plurality of pieces of registration authentication information each of which is unique to an authentication target, the plurality of pieces of registration authentication information being based on biological information obtained from different and the same kind of parts of a living body of a registered user; personal authentication information generation means for acquiring biological information from a part selected by a user from among the parts of the living body of the user to be authenticated, and then generating personal authentication information based on the biological information acquired; collation means for arranging a collation order of the plurality of pieces of registration authentication information acquired, and then sequentially collating the plurality of pieces of registration authentication information with the personal authentication information in accordance with the collation serial numbers; and notification means for notifying an external section of the authentication target whose the registration authentication information corresponds to the personal authentication information as an authentication target successfully authenticated. Therefore, what the user to be authenticated has to do is just to perform authentication operation using a part of a living body which corresponds to an arbitrary authentication target. As a result, this authentication target is selected from among a plurality of authentication targets and then is authenticated. Thus, the authentication apparatus and authentication method according to an embodiment of the present invention can adequately perform an authentication process for a plurality of authentication targets with simple operation.

The nature, principle and utility of the embodiments will become more apparent from the following detailed description when read in conjunction with the accompanying drawings in which like parts are designate by like reference numerals or characters.

Additional features and advantages are described herein, and will be apparent from, the following Detailed Description and the figures.

DETAILED DESCRIPTION

An embodiment will be described in detail with reference to the accompanying drawings.

(1) Overall Configuration of Authentication Device

Figure 1:
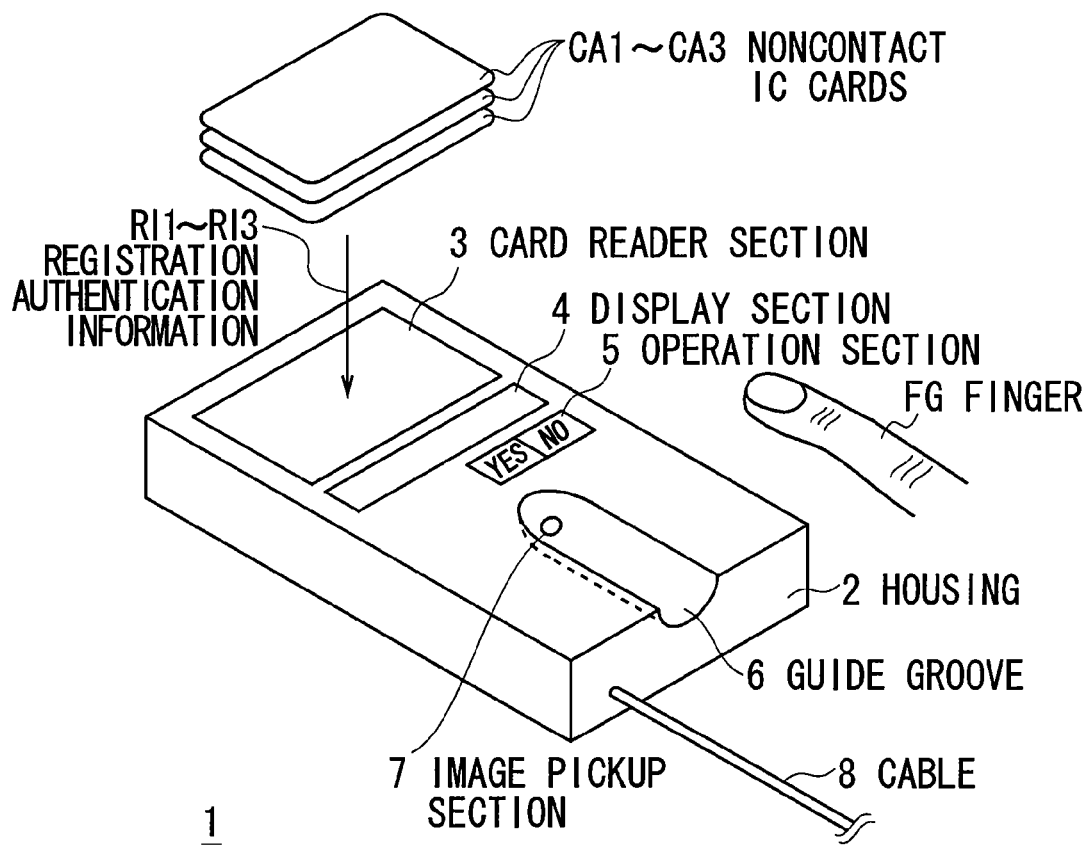
FIG. 1 is a schematic diagram showing the overall configuration of an authentication device according to an embodiment.

In FIG. 1, the reference numeral 1 denotes an authentication device as a whole according to an embodiment of the present invention. A card reader section 3 is disposed at the back of the top surface of a housing 2. A display section 4 and an operation section 5 are disposed in front of the card reader section 3. The display section 4 displays various messages to users. The operation section 5 accepts operation performed by users.

A substantially curve-shaped guide groove 6 is formed at the front side of the top surface of the housing 2. A user's finger (referred to as an authentication finger FG), which is a target to be authenticated by biometrics authentication, is put on the guide groove 6 to be positioned. An image pickup section 7 is installed inside the guide groove 6. The image pickup section 7 is positioned in predetermined relationship with respect to the guide groove 6 such that the image pickup section 7 is opposite to a finger pad of the authentication finger FG placed on the guide groove 6. The image pickup section 7 emits infrared light to the finger pad, and then takes an image of veins inside the finger pad based on reflection of the infrared light.

The card reader section 3 wirelessly exchanges data with a noncontact IC card CA placed on the top surface of the card reader section 3 without contacting the noncontact IC card CA. In this case, the noncontact IC card CA is for example equivalent to a credit card. A card number CN, which is unique to a card, and a piece of registration authentication information RI, which is also unique to a card and includes a vein pattern generated by performing pattern extraction process to the image of veins of the user of the card, are previously stored and registered in the noncontact IC card CA. Each noncontact IC card CA includes a different piece of registration authentication information RI generated based on different images of veins of fingers.

Figure 2:
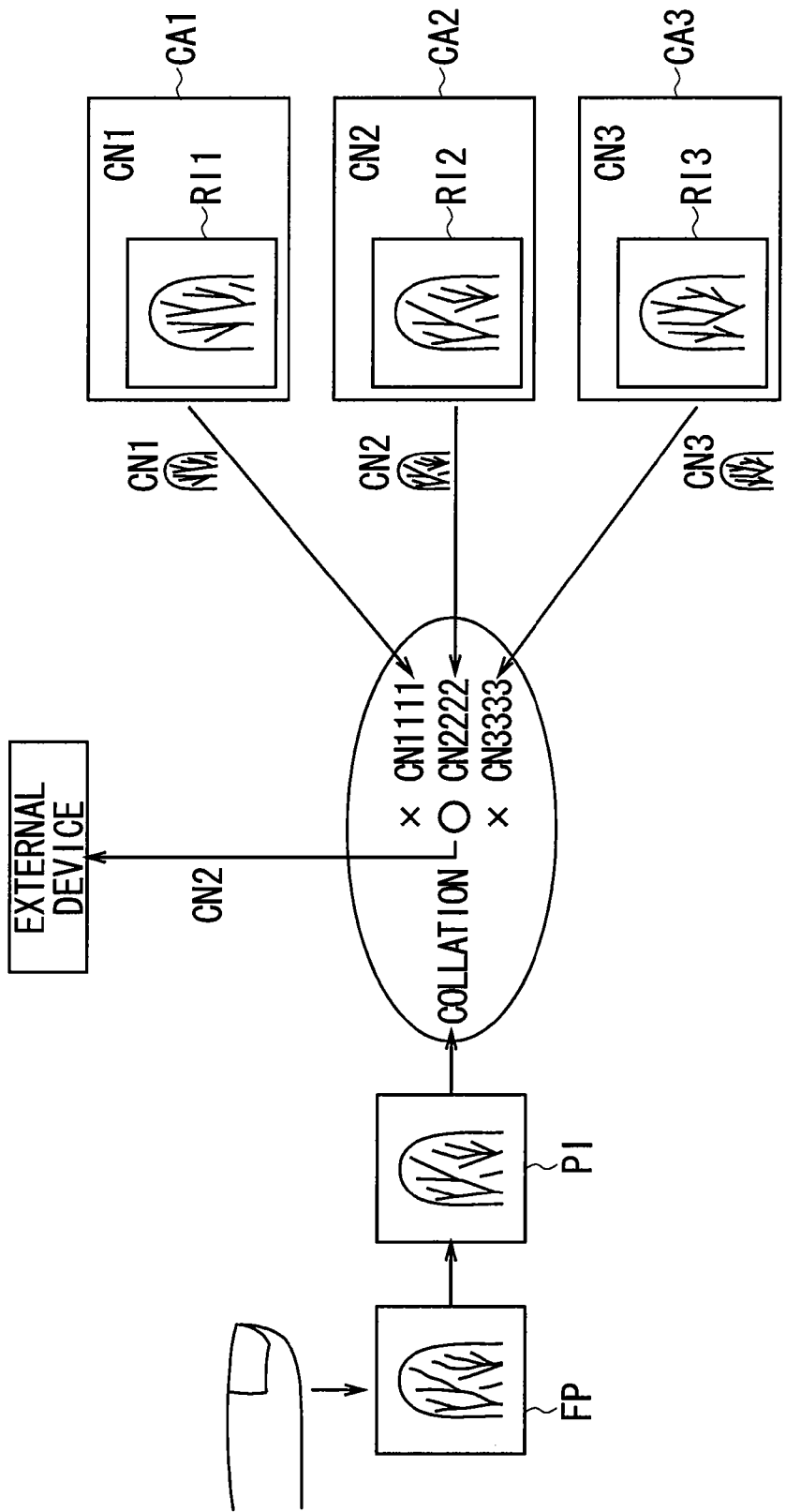
FIG. 2 is a schematic diagram illustrating a concept of authenticating a plurality of cards.

As shown in FIG. 2, the authentication device 1 reads out from one or a plurality of noncontact IC cards CA placed on the card reader section 3 shown in FIG. 1 (from the three noncontact IC cards CA1 to CA3, in this case) one piece or a plurality of pieces of registration authentication information RI (RI1 to RI3) and one or a plurality of the card numbers CN (CN1 to CN3), and at the same time controls the image pickup section 7 (FIG. 1) to perform image pickup process for the finger pad of the authentication finger FG to take a vein image FP as biological information. The authentication device 1 then performs pattern extraction process for the vein image FP to generate personal authentication information PI.

The authentication device 1 subsequently collates the registration authentication information RI, which is read out from a noncontact IC card CA, with the personal authentication information PI, which is obtained from the authentication finger FG, to determine whether a user of this card is legitimate or not (i.e., personal authentication). When the registration authentication information RI of the noncontact IC card CA corresponds to the personal authentication information PI, the authentication device 1 regards the user of this noncontact IC card CA as a legitimate user (Authentication OK), and then notifies an external device of its card number CN through a cable 8 (FIG. 1).

As a result, the external device, such as an automatic teller machine (ATM), identifies the user of the noncontact IC card CA based on the card number CN notified, and provides this user with various services.

(2) Circuit Configuration of Authentication Device and Noncontact IC Card

Figure 3:
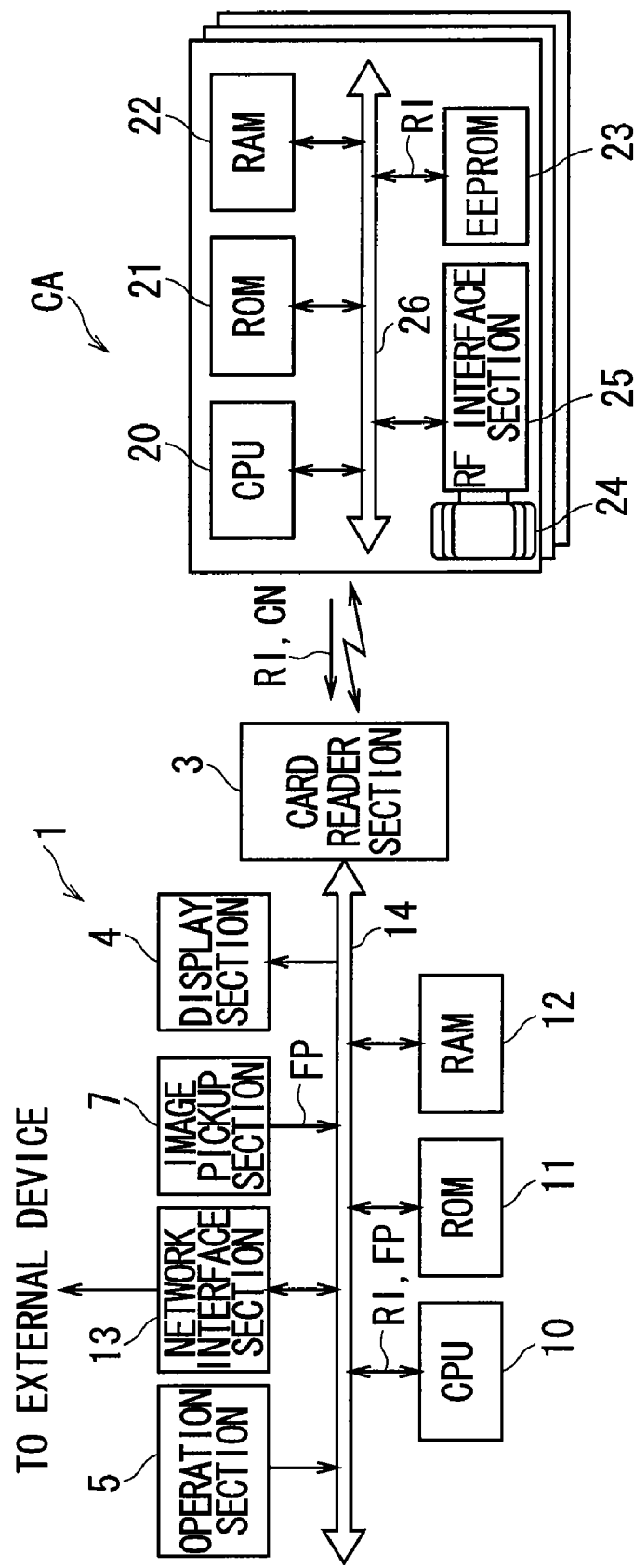
FIG. 3 is a block diagram showing the configuration of the authentication device and a noncontact IC card.

As shown in FIG. 3, the authentication device 1 includes a Central Processing Unit (CPU) 10 that takes overall control of the authentication device 1. The CPU 10 connects through a bus 14 with a Read Only Memory (ROM) 11, which stores a basic program and authentication program performed by the CPU 10; a Random Access Memory (RAM) 12, which is utilized as a work area and a load area for programs; the card reader section 3; the image pickup section 7; the display section 4; the operation section 5; and a network interface section 13, which exchanges data with the external device. The card reader section 3 is controlled by the CPU 10 and wirelessly exchanges data with the noncontact IC card CA placed without contacting the noncontact IC card CA.

When the card reader section 3 detects that the noncontact IC card CA is placed on its readout section, the card reader section 3 supplies a card detection signal to the CPU 10. When the CPU 10 receives the card detection signal, the CPU 10 transmits an authentication information readout request to each noncontact IC card CA placed on the card reader section 3.

The noncontact IC card CA includes a CPU 20 that takes overall control of the noncontact IC card CA. The CPU 20 connects through a bus 26 with a ROM 21, which stores programs performed by the CPU 20; a RAM 22, which is utilized as a work area and a load area for programs; an Electrically Erasable Programmable ROM (EEPROM) 23, which stores various information such as the registration authentication information RI and the card number CN; and a RF interface section 25, which wirelessly communicates with the card reader section 3 through an antenna 24.

In response to the authentication information readout request from the authentication device 1, the CPU 20 of the noncontact IC card CA reads out the above-noted registration authentication information RI and the card number CN from the EEPROM 23, and then transmits the registration authentication information RI and the card number CN to the card reader section 3 through the RF interface section 25 and the antenna 24.

The CPU 10 of the authentication device 1 follows the authentication program and then stores the registration authentication information RI and card number CN received from each noncontact IC card CA in the RAM 22 such that they are associated with one another. At the same time, the CPU 10 performs pattern extraction process for the vein image FP of the authentication finger FG taken by the image pickup section 7 to generate the personal authentication information PI indicative of the vein pattern, and then stores the personal authentication information PI in the RAM 22. The CPU 10 then follows the authentication program to perform process of biometrics authentication in which the registration authentication information RI stored in the RAM 22 is sequentially collated with the personal authentication information PI.

(3) Biometrics Authentication Process

Figure 4:
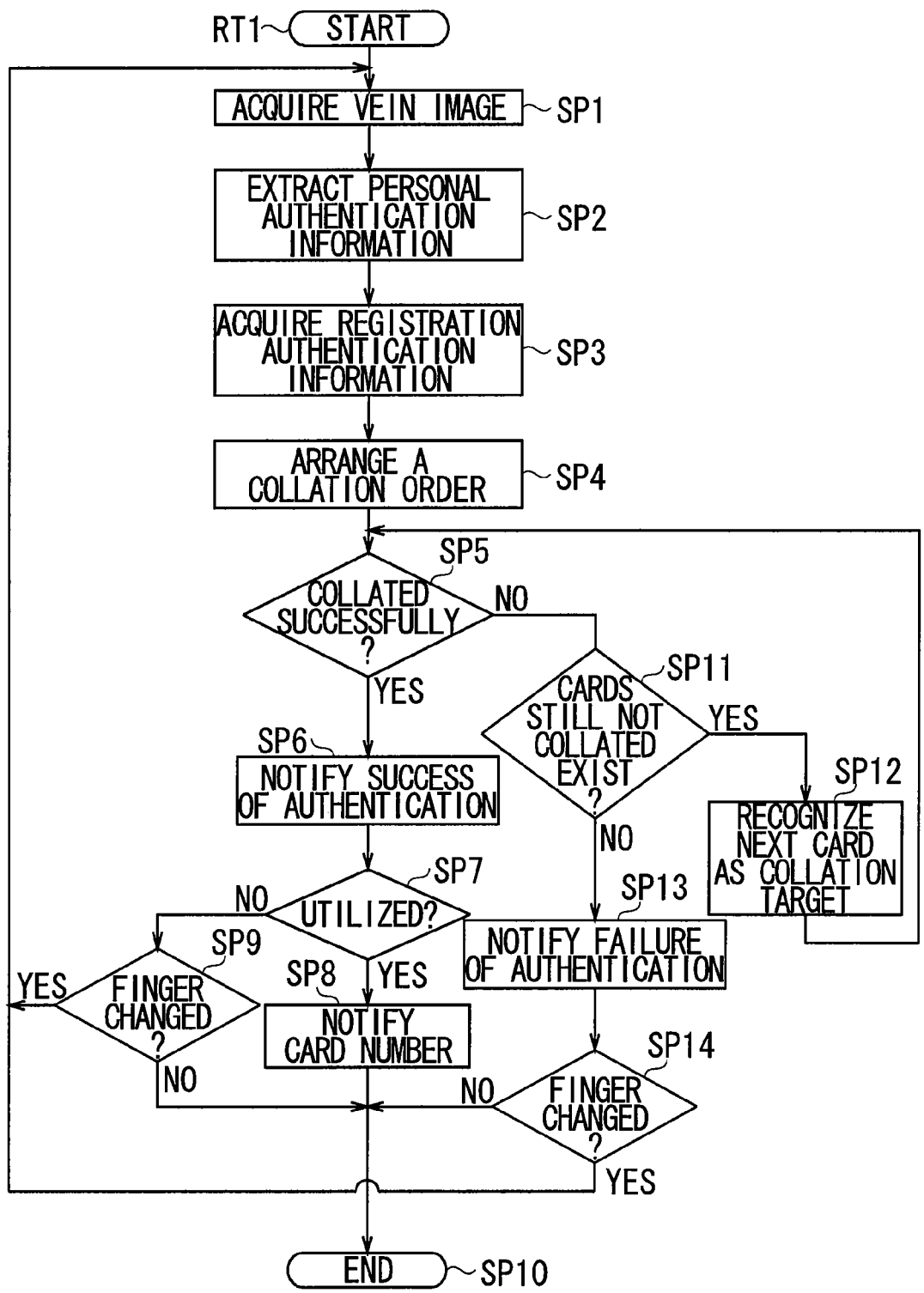
FIG. 4 is a flowchart illustrating an authentication process.

With reference to a flowchart shown in FIG. 4, an authentication process procedure, which utilizes a technology of biometrics authentication for a plurality of noncontact IC cards CA, will be described.

In this authentication process, a user puts the noncontact IC card CA, which he/she intends to use as an authentication target, on the card reader section 3 (FIG. 1). This noncontact IC card CA will be referred to as a utilization card. In this case, the user does not have to pick up the utilization card from a plurality of noncontact IC cards he/she has. The user can put all the cards on the card reader section 3 at the same time.

The user subsequently chooses the authentication finger FG and puts the authentication finger FG on the guide groove 6. At this time, the image pickup section 7 takes the vein image FP of the authentication finger FG.

When the CPU 10 of the authentication device 1 detects that the noncontact IC card CA is placed on the card reader section 3, the CPU 10 starts a routine RT1 of authentication process at start step and then proceeds to next step SP1. At step SP1, the CPU 10 controls the image pickup section 7 to take the image of the authentication finger FG of the user, and then proceeds to next step SP2 when the CPU 10 acquires the vein image FP from the image pickup section 7.

At step SP2, the CPU 10 performs pattern extraction process for the vein image FP to generate the personal authentication information PI, and then proceeds to next step SP3 after storing the personal authentication information PI in the RAM 12.

At step SP3, the CPU 10 wirelessly communicates with all the noncontact IC cards CA placed on the card reader section 3, and reads out a plurality of pieces of registration authentication information RI and card numbers CN stored in each EEPROM 33 of noncontact IC cards CA. The CPU 10 subsequently stores the card numbers CN and the plurality of pieces of registration authentication information RI in the RAM 12 such that they are associated with one another, and then proceeds to next step SP4.

At step SP4, the CPU 10 arranging a collation order of each card number CN stored in the RAM 12 in accordance with a predetermined ranking rule, and recognizes the card number CN of the collation serial number 1 as a first collation target. The CPU 10 then proceeds to next step SP5. In this manner, the CPU 10 determines the first collation target and then performs authentication process. By the way, the collation serial numbers are determined in various manners, for example the collation serial numbers are determined based on an order by which the card reader section 3 detected the noncontact IC cards CA. The collation serial numbers may be determined based on the magnitude of the card numbers CN.

At step SP5, the CPU 10 reads out from the RAM 12 the personal authentication information PI, which was generated based on the user's finger FG, and the registration authentication information RI of the collation-target noncontact IC card CA (the collation-target noncontact IC card CA is determined based on the collation serial number), and then collates the personal authentication information PI with the registration authentication information RI. The CPU 10 subsequently determines whether the personal authentication information PI corresponds to the registration authentication information RI.

Affirmative result at step SP5 means that the personal authentication information PI corresponds to the registration authentication information RI, which is to say that the authentication finger FG (whose image was taken by the image pickup section 7) has been registered in the collation-target noncontact IC card CA and therefore this user is a legitimate user of the collation-target noncontact IC card CA. In this case, the CPU 10 proceeds to step SP6.

At step SP6, to notify the user of the success of authentication and to ask the user whether to use this approved noncontact IC card CA, the CPU 10 displays on the display section 4 a message such as "Authentication result is OK. Would you like to use the card with the card number 1234-****?" The CPU 10 then proceeds to next step SP7.

The user checks the message on the display section 4, and then pushes a YES button of the operation section 5 when he/she wants to use the noncontact IC card, or pushes a NO button of the operation section 5 when he/she does not want to use the noncontact IC card. In this manner, the user decides to use this approved noncontact IC card CA or not.

At step SP7, to check whether the user wants to use the noncontact IC card CA or not, the CPU 10 waits till he/she pushes the YES button or NO button of the operation section 5. Pushing the YES button at step SP7 means that the user shows his/her intention that he/she wants to use the noncontact IC card CA. In this case, the CPU 10 proceeds to next step SP8. At step SP8, the CPU 10 notifies the external device connected to the cable 8 of the card number CN of this approved noncontact IC card CA, and then proceeds to next step SP10 to end the authentication process.

Pushing the NO button of the operation section 5 at step SP7 means that the user shows his/her intention that he/she does not want to use the noncontact IC card CA. In this case, the CPU 10 displays on the display section 4 a message about this approved noncontact IC card CA such as "utilizing process for the card with the card number 1234-**** is now stopped." The CPU 10 subsequently proceeds to step SP9.

At step SP9, the CPU 10 displays on the display section 4 a message such as "Do you want to change the finger to be authenticated?" The CPU 10 then waits till the user pushes the YES button or NO button of the operation section 5. Pushing the YES button at step SP9 means that the user shows his/her intention that he/she wants to change the authentication finger FG to continue the authentication. In this case, the CPU 10 returns to step SP1 and then acquires a new vein image FP from a different authentication finger FG. After that the CPU 10 repeatedly performs the process of step SP2 and subsequent steps.

Pushing the NO button at step SP9 means that the user shows his/her intention that he/she wants to stop the authentication for all the noncontact IC cards CA placed on the card reader section 3. In this case, the CPU 10 proceeds to next step SP10 to end the authentication process.

On the other hand, negative result at step SP5 means that the personal authentication information PI of the authentication finger FG does not correspond to the registration authentication information RI of the collation-target noncontact IC card CA. In this case, the CPU 10 proceeds to next step SP11.

At step SP11, based on the collation serial numbers allocated to the card numbers, the CPU 10 checks whether or not there is a noncontact IC card CA left without being collated. Affirmative result at step SP11 means that there is a noncontact IC card CA still left without being collated. In this case, the CPU 10 proceeds to next step SP12.

At step SP12, the CPU 10 recognizes the noncontact IC card with next collation serial number as a next collation target, and returns to step SP5. And then the CPU 10 at step SP5 collates the registration authentication information RI of this new collation-target noncontact IC card CA with the personal authentication information PI. In this manner, the CPU 10 sequentially authenticates the plurality of noncontact IC cards CA in accordance with the collation serial numbers.

By contrast, negative result at step SP11 means that any registration authentication information RI does not correspond to the personal authentication information PI as a result of collating all the noncontact IC cards CA. In this case, the CPU 10 proceeds to step SP13.

At step SP13, to notify the user of the failure of authentication and ask the user whether to change the authentication finger FG, the CPU 10 displays on the display section 4 a message such as "Authentication result is NG. The finger authenticated is not registered in any cards. Do you want to change the finger to be authenticated?" The CPU 10 then proceeds to next step SP14.

The user follows the message on the display section 4. That is to say, the user pushes the YES button of the operation section 5 when he/she wants to continue the authentication after changing the authentication finger FG. When the user wants to stop the authentication for the noncontact IC cards CA without changing the authentication finger FG, he/she pushes the NO button. In this manner, the user decides whether to change the authentication finger FG.

At step SP14, to check whether the user changes the authentication finger FG or not, the CPU 10 waits till he/she pushes the YES button or NO button of the operation section 5. Pushing the YES button at step SP14 means that the user shows his/her intention that he/she wants to continue the authentication after changing the authentication finger FG. In this case, the CPU 10 returns to step SP1, and then acquires a new vein image FP from a different authentication finger FG. After that, the CPU 10 repeatedly performs the process of step SP2 and subsequent steps.

Pushing the NO button at step SP14 means that the user shows his/her intention that he/she wants to stop the authentication process. In this case, the CPU 10 proceeds to step SP10 to end the authentication process.

In this manner, when the user wants to use one of his/her noncontact IC cards CA, he/she puts his/her authentication finger FG that is registered in this card on the guide groove 6. This allows the authentication device 1 to authenticate this noncontact IC card CA out of the plurality of noncontact IC cards CA he/she has. By pushing the operation section 5, the user can change the authentication finger FG. This allows the authentication device 1 to authenticate other cards.

(4) Operation and Effect

With the above configuration the authentication device 1 reads out the card numbers CN and the plurality of pieces of registration authentication information RI from the plurality of noncontact IC cards CA placed on the card reader section 3. At the same time, the authentication device 1 acquires a vein image FP from the user's authentication finger FG, and performs pattern extraction process for the vein image FP to generate the personal authentication information PI.

The authentication device 1 then arranges the collation order of the card numbers CN read out from the noncontact IC cards CA. The authentication device 1 sequentially collates the registration authentication information RI of the noncontact IC cards CA with the personal authentication information PI in accordance with the collation serial numbers. When the registration authentication information RI corresponds to the personal authentication information PI, the authentication device 1 regards the user corresponding to the personal authentication information PI as a legitimate user, and then notifies the external device connected of the card number of this noncontact IC card CA.

In this manner, the user can select the noncontact IC card CA to be authenticated by changing his/her authentication finger FG placed.

In addition, even if the user has a plurality of noncontact IC cards, he/she does not have to pick up from the plurality of cards he/she has a utilization card to be placed on the card reader section 3. The user can put all the cards he/she has on the card reader section 3 at the same time. The authentication device 1 authenticates the noncontact IC card CA corresponding to the authentication finger FG.

Since the authentication device 1 has the above configuration, the user just selects one of his/her authentication fingers FG to let the authentication device 1 authenticate one of the plurality of noncontact IC cards CA corresponding to the selected authentication finger FG. Thus, the user does not have to perform complicated operation to let the authentication device 1 authenticate the card.

(5) Other Embodiments

In the above-noted embodiments, the noncontact IC cards CA stores the registration authentication information RI, and the authentication device 1 reads out the registration authentication information RI from the noncontact IC cards CA to collate with the personal authentication information PI. However, the present invention is not limited to this. An authentication server may store all pieces of registration authentication information RI of the noncontact IC cards CA. In this case, for example, when the authentication device 1 acquires the personal authentication information PI, the authentication device 1 transmits the personal authentication information PI to the authentication server which then performs authentication process.

In this case, the authentication server includes a database where the card numbers CN of the noncontact IC cards CA are associated with each piece of registration authentication information RI. The authentication device reads out the card numbers CN from the noncontact IC cards CA placed on the card reader section, and then transmits, along with the personal authentication information PI acquired from the user's authentication finger FG, the card numbers CN to the authentication server.

The authentication server reads out from the database one piece of registration authentication information RI corresponding to the card number CN transmitted from the authentication device, and then collates the registration authentication information RI with the personal authentication information PI.

In addition, in the above-noted embodiments, one piece of registration authentication information RI generated from one authentication finger FG is registered for one noncontact IC card CA. However, the present invention is not limited to this. A plurality of pieces of registration authentication information RI generated from a plurality of authentication fingers FG may be registered for one noncontact IC card CA.

In this case, for example, even when the user has some difficulty in using the registered finger FG because of injury or the like, the user can use other authentication fingers FG which correspond to other pieces of registration authentication information RI registered in the noncontact IC card CA.

Furthermore, in the above-noted embodiments, the authentication process of biometrics is performed using user's veins. However, the embodiments are not limited to this. The authentication process of biometrics may be performed using biological information, which represents the same part of the body (which is one of the two or more parts on the body), such as fingerprints or irises.

Furthermore, in the above-noted embodiments, the authentication device 1 ends the authentication process after the noncontact IC card CA has been authenticated by the personal authentication information PI corresponding to one authentication finger FG. However, the present invention is not limited to this. The authentication device 1 may continue the authentication process to authenticate other noncontact IC cards CA based on other authentication fingers FG.

The above continuous authentication process for a plurality of noncontact IC cards CA can be applied to operation of a bank transfer between the bank accounts. For example, a bank cash card authenticated first becomes a bank account from which funds are withdrawn, and a bank card authenticated next becomes a bank account to which the finds are transferred.

Accordingly, when a user tries to transfer finds between the bank accounts, he/she puts a plurality of noncontact IC cards CA he/she has on the card reader section 3 at the same time, and lets the authentication device 1 authenticate his/her registered finger FG corresponding to the bank cash card from which funds are withdrawn. After that he/she lets the authentication device 1 authenticate his/her other registered finger FG corresponding to the bank cash card to which the funds are transferred. In this manner, the user does not have to pick up these cards (i.e., the card from which funds are withdrawn, and the card to which the funds are transferred) from among the plurality of cards, and therefore the user can transfer funds between the bank accounts easily.

Furthermore, in the above-noted embodiments, the authentication device 1 supporting the noncontact IC cards CA is applied. However, the present invention is not limited to this. An authentication device supporting contact-type cards may be applied to an embodiment of the present invention.

In a case in which operation of a bank transfer between the bank accounts is performed with the contact-type cards in the same way as described above, a user inserts those cards (i.e., the card from which funds are withdrawn, and the card to which the funds are transferred) into a loading slot of the authentication device without thinking of the order of inserting the cards. He/she then lets the authentication device 1 authenticate his/her registered finger FG corresponding to the bank cash card from which funds are withdrawn. After that he/she lets the authentication device 1 authenticate his/her other registered finger FG corresponding to the bank cash card to which the funds are transferred. Therefore, the user can transfer funds between the bank accounts easily.

Furthermore, in the above-noted embodiments, the CPU 10 arranges the collation order of the plurality of noncontact IC cards CA in accordance with the predetermined ranking rule, and then sequentially authenticates the noncontact IC cards CA in accordance with the collation serial numbers. However, the embodiments are not limited to this. A user may arbitrarily allocate the collation serial numbers. For example, a user may arrange an earlier collation order of the most frequently used noncontact IC card CA to authenticate this card earlier than others.

The authentication apparatus and authentication method according to an embodiment can be utilized to authenticate cash cards, credit cards, and the like.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. An authentication apparatus comprising:
   detection means for detecting a plurality of authentication targets;
   registration authentication information acquisition means for acquiring a plurality of pieces of registration authentication information based on a detection of the plurality of authentication targets, wherein each of said plurality, of pieces of registration authentication information is unique to an authentication target, said plurality of pieces of registration authentication information being based on biological information obtained from different kinds of parts or the same kind of parts of a living body of a registered user;
   personal authentication information generation means for acquiring biological information from a part of the living body selected by the user to be authenticated, and then generating personal authentication information based on said biological information acquired;
   collation means for arranging a collation order, of said plurality of pieces of registration authentication information acquired, and then sequentially collating said plurality of pieces of registration authentication information with the personal authentication information in accordance with said collation order, wherein the collation order is based on an order the of authentication targets are detected by the detection means; and
   notification means for notifying an external section of said authentication target whose said registration authentication information corresponds to said personal authentication information as an authentication target successfully authenticated.

2. The authentication apparatus according to claim 1, wherein
   said registration authentication information is stored in said corresponding authentication target, and
   said registration authentication information acquisition means acquires the plurality of pieces of registration authentication information from the plurality of authentication targets.

3. The authentication apparatus according to claim 1, wherein
   all pieces of said registration authentication information are stored in an authentication information storage means, and
   said registration authentication information acquisition means acquires the plurality of pieces of registration authentication information from said authentication information storage means.

4. An authentication method comprising:
   detecting a plurality of authentication targets via a detection means;
   acquiring registration authentication information by acquiring a plurality of pieces of registration authentication information based on a detection of the plurality of authentication targets, wherein each of said plurality of pieces of registration authentication information unique to an authentication target, said plurality of pieces of registration authentication information being based on biological information obtained from different kinds of parts or the same kind of parts of a living body of a registered user;

generating personal authentication information by first acquiring biological information from a part of the living body selected by the user to be authenticated, and then generating personal authentication information based on said biological information acquired;

collation step of arranging a collation order of said plurality of pieces of registration authentication information acquired, and then sequentially collating said plurality of pieces of registration authentication information with the personal authentication information in accordance with said collation order, wherein the collation order is based on an order the plurality of authentication targets are detected by the detection means; and notifying an external section of said authentication target whose said registration authentication information corresponds to said personal authentication information as an authentication target successfully authenticated.

5. An authentication apparatus comprising:

a detection section configured to detect a plurality of authentication targets;

a registration authentication information acquisition section configured to acquire a plurality of pieces of registration authentication information based on a detection of the plurality of authentication targets, wherein each of said plurality of pieces of registration authentication information, is unique to an authentication target, said plurality of pieces of registration authentication information being based on biological information obtained from different kinds of parts or the same kind of parts of a living body of a registered user;

a personal authentication information generation section configured to acquire biological information from a part of the living body selected by the user to be authenticated, and then generating personal authentication information based on said biological information acquired;

a collation section configured to arrange a collation order of said plurality of pieces of registration authentication information acquired, and then sequentially collating said plurality of pieces of registration authentication information with the personal authentication information in accordance with said collation order, wherein the collation order is based on an order the plurality of authentication targets are detected by the detection section; and a notification section configured to notify an external section of said authentication target whose said registration authentication information corresponds to said personal authentication information as an authentication target successfully authenticated.

6. The authentication apparatus according to claim 2, wherein the plurality of authentication targets are a plurality of IC cards.

\* \* \* \* \*